Jan. 1, 1929.
C. A. FRANK
1,697,421
COMBINED AIR GAUGE AND SIGNAL
Filed Feb. 17, 1928
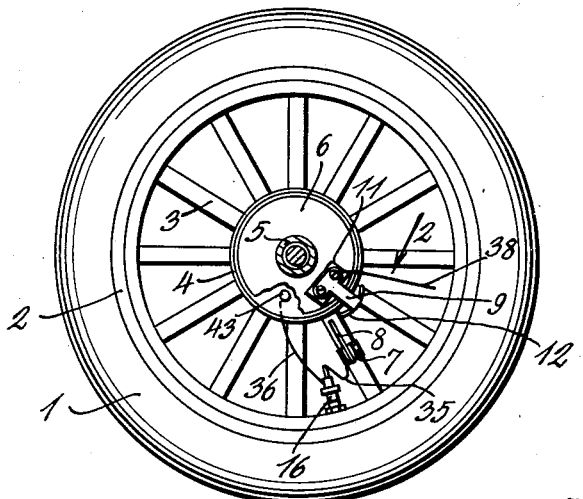
Inventor
Clarence A. Frank.
By H. J. O'Brien
Attorney Patented Jan. 1, 1929.

1,697,421

UNITED STATES PATENT OFFICE.

CLARENCE A. FRANK, OF CHEYENNE, WYOMING.

COMBINED AIR GAUGE AND SIGNAL.

Application filed February 17, 1928. Serial No. 254,964.

This invention relates to improvements in tire pressure gauges and signals.

It is well known that automobiles employ pneumatic tires which must be maintained inflated to a certain pressure in order to secure successful operation. It often happens that leaks occur due to defects that develop in the valve contained in the valve stem, or due to punctures. When such slow leaks occur, the pressure in the tire gradually diminishes and this gradual decrease in pressure is not noticeable until it becomes so low that the tire casing has been badly damaged.

It is the object of this invention to produce a simple and substantial device that can be applied to the valve stems of the tires and which shall be provided with means by which a signal located on the instrument board will be made operative when the tire pressure decreases below a predetermined value.

It is a further object of this invention to produce a device by means of which the pressure in the tire can be determined by an inspection of the device itself.

My invention, briefly described, comprises a miniature pressure gauge that is applied to the valve stem and which has a calibrated indicator that projects through an opening a distance commensurate with the pressure in the tire. This indicator is also provided with a circuit closing means which becomes operative when the pressure falls to a predetermined value and which produces the operation of a signal located on the instrument board.

Having thus briefly described the invention, the same will now be described in detail and reference for this purpose will be had to the accompanying drawing in which the preferred embodiment has been illustrated, and in which:

Fig. 1 is a side elevation of the inner surface of an automobile wheel showing my device in place thereon;

Fig. 2 is a view looking in the direction of arrow 2 in Fig. 1 and shows the manner of securing the intermittent contact makers to the wheel and brake housing;

Fig. 3 is a longitudinal section through my device showing the same in place on a tire valve stem;

Fig. 4 is a section similar to that shown in Fig. 3 and shows the parts in circuit closing position;

Fig. 5 is a section taken on line 5—5, Fig. 4, showing the locking pin, the parts being illustrated to an enlarged scale;

Fig. 6 is a view similar to that shown in Fig. 5, and shows the pin in retracted position; and Fig. 7 is a diagrammatic representation of the wiring connections.

In the drawing numeral 1 represents an ordinary pneumatic tire casing which is attached to rim 2 of an automobile wheel. This wheel has been shown as having a plurality of spokes 3 to which is secured a brake drum 4. In Fig. 1 the axle housing 5 has been shown in cross section and this carries a circular flange 6 to which parts of the brake mechanism are attached. Secured to one of the spokes is a clamp 7 to which is secured a spring 8 that extends inwardly towards the brake drum in the manner shown in Fig. 1. An electrical contact member 9 is secured to the cylindrical flange 6 by means of screws 10 and is insulated from the flange by means of an insulating separator 11. The outer end of contact member 9 has an arcuate portion 12 which lies in the path of the spring 8 so that whenever the spring passes over this part of its arc, it will make electrical connection with contact member 9.

The pneumatic tire is provided with a valve stem 13 of the usual construction. Valves of this type have their outer surfaces threaded in the manner clearly shown in Fig. 3, and terminate in an end portion 14 of somewhat smaller diameter, which is also provided with threads on its outer surface. A valve assembly having a stem 15 is located within the valve stems 13 and prevents the escape of air. As these valves are merely of the kind ordinarily employed and form no part of this invention, they will not be described in detail, and the stem 15 has been shown merely for the purpose of better illustrating the invention.

The invention which forms the subject matter of this application comprises a cylindrical tubular member 16 whose axial opening, which extends the entire length, is of two different diameters, the lower end of the tubular member having an internal thread 17, which cooperates with the threads on the valve stem 13. The upper end of the opening in member 16 is provided with an internal thread 18 of a greater pitch than thread 17. For the purpose of facilitating the rotation of member 16, it has been provided with a circular flange 19 which can be engaged for the purpose of rotating it. Attached to the upper end of tubular member 16 is an air pressure gauge comprising a body member 20 whose lower end has an external thread of the proper shape and pitch to cooperate with threads 18. The lower end of member 20 has a central opening 21 within which is located an elastic gasket 22 which is preferably made of rubber. This gasket is held in place by means of a tubular screw 23. From Figs. 3 and 4 it will be seen that when the parts are assembled in the manner indicated, the elastic gasket 22 will be forced against the upper end of the valve stem so as to make an air tight connection and at the same time, tubular member 23 will engage the valve stem 15 so as to open the valve within the stem.

The upper end of member 20 is provided with a center opening whose inner surface is threaded in the manner indicated by numeral 24. Cylindrical member 25, having one end open and the other one closed by transverse partition 26, is provided near its open end with threads which engage the threads 24 by means of which it is held in place. Located within the tubular member 25 is an elastic bag 27 whose lower end is open and provided with flanges 28 that extend outwardly and which are clamped against the bottom of the threaded opening by means of the tubular member 25. The partition 26 is provided with a central opening in which is located an insulating bushing 29. A rod 30 extends through the opening in the bushing and has its lower end securely attached to the upper end of the bag 27 in the manner indicated at 31 in Figs. 3 and 4. The rod 30 is provided with graduations 32 which are calibrated to indicate the air pressure within the bag 27. These calibrations are preferably provided with figures that indicate their value but these have not been shown in the drawing. Rod 30 is also provided with a plurality of holes 33 for the reception of the pin 34. This pin may be placed in any one of the holes 33 so as to contact with the upper end of tubular member 25 in the manner shown in Fig. 4 whenever the pressure falls below a predetermined value. It is apparent that when the parts are in the position shown in Fig. 4, an electrical connection is made between the conductors 35 and 36, but when the parts are in the position shown in Fig. 3 the circuit between conductors 35 and 36 is open.

Referring now more particularly to Fig. 4 it will be seen that the contact members 9 are all connected to one terminal of a battery 37, by means of conductors 38, 39 and 40. A lamp 41 is connected in series with the common lead 40 so that it will light up whenever current is flowing through this conductor. The other terminal of the battery is grounded to the chassis of the automobile at 42. Conductor 35 is grounded to the chassis of the car at 43. Let us now consider a case in which the parts are connected in the manner shown in Fig. 7 and let us also assume that the pressure within the automobile tire has decreased until the pin 34 rests on the end of tubular member 25, as shown in Fig. 4. When the wheel rotates, the spring 8 will make electrical contact with the contact member 9 at each revolution of the wheel. Whenever spring 8 rests on the contact member 9, corresponding to the wheel having the tire with the low pressure, current will flow from the battery through lamp 41 and through conductors 39 and 38 to the contact member 9 and from thence through spring 8, conductor 35, bar 30 and conductor 36 to the ground 43. Whenever this occurs the lamp 41 will light up, and as this lamp can be located on the instrument board, the driver of the automobile will be apprised by the flickering of lamp 41 that one of his tires is underinflated. It is apparent from Fig. 7 that this signal will operate regardless of which one of the tires is underinflated, as all the contact members 9 are connected in parallel.

Attention is called at this point to the fact that in my apparatus a continuous circuit is not depended on and therefore the wiping contacts 8 and 9 can be used instead of slip rings. It is also apparent that as the signal is formed by means of an incandescent lamp, that the actual value of the current is not material just so that it is large enough to make the filament in the lamp glow.

I have called attention heretofore to the fact that the opening in member 16 has threads of different pitch, the threads indicated by numeral 17 being of the proper pitch to cooperate with the threads of the valve stem and threads 18 being of greater pitch. The reason for this is that by this means a differential action is obtained which permits the air valve comprising parts 20 and 25 to be attached and removed from the valve stem without necessitating the rotation of these parts. This is accomplished in the following manner. When the gauge is applied, member 16 is turned onto stem 13 until its upper end is below the threaded portion of the tip having the reduced diameter. Part 20 is then put into place with the elastic gasket 22 resting on the upper end of the valve stem, member 16 is now rotated in the direction, unscrewing it from the valve stem. As soon as the threads 18 engage the threads on the member 20, the parts will be connected together and by means of the differential action of the threads, part 20 is forced downwardly so as to compress the gasket 22. For the purpose of preventing accidental rotation of parts 16 and 20, I have provided a spring pressed pin 44 which extends through the side of member 16 near the upper end of the latter. This pin is urged inwardly by means of a spring 45 and member 20 is provided with a plurality of openings 46 which are adapted to be engaged by the inner end of the pin in the manner shown in Fig. 5. By this means, the parts are held from accidental relative rotation.

When the tire to which my mechanism is attached is to be inflated, the operator must remove the pressure gauge comprising members 20, 25 and 27 and screw the tubular member 16 down so as to make the threaded tip of the valve stem available for connection with the air chuck; after this has been done, the parts have to be replaced so as to occupy the position shown in Figs. 3 and 4.

From Figs. 5 and 6 it will be seen that pin 44 is provided with a shoulder by means of which it can be latched in inoperative position in the manner shown in Fig. 6 so as to leave the operator's hands free to manipulate the gauge.

From the above description it will be apparent that I have produced a combined pressure gauge and signal that can be applied to each of the valve stems of an automobile and by means of which it is possible to quickly determine by inspection the condition of the inflation of the tires and which will also operate a signal if the pressure within any one of the tires falls below the predetermined value.

Having described my invention what is claimed as new is:

1. In a device of the class described, in combination, a cylindrical body member having a portion of its outer surface threaded, one end of said body member having a recess, a gasket secured in said recess, the other end of said body member having a threaded opening, a tubular member threadedly secured in the last named opening, an elastic bag located within said tubular member and having its open end clamped between the end of the tubular member and the bottom of the last named recess, a graduated indicator bar secured to said elastic member, said bar extending through an opening in the tubular member, means for insulating said bar from the tubular member when the bar is in extended position and means for electrically connecting the bar with the tubular member when the bar is in retracted position.

2. In a device of the class described, in combination, a valve stem having its outer surface threaded, an elongated tubular sleeve threadedly connected with said stem, one end of said sleeve having threads of a greater pitch than the other, a pressure indicator comprising a cylindrical body portion adapted to be positioned against the end of a valve stem, said body member having threads adapted to be engaged by the threads of the sleeve which has the greatest pitch, whereby a differential action is obtained which moves the cylindrical body member towards or away from the valve stem in accordance with the direction of rotation of the cylindrical sleeve and means carried by the pressure indicator for closing an electric circuit when the pressure falls below a predetermined value.

In testimony whereof I affix my signature.

CLARENCE A. FRANK.